United States Patent [19]
Weist

[11] 3,981,457
[45] Sept. 21, 1976

[54] PLASTIC COMMINUTING METHOD AND APPARATUS

[75] Inventor: Herman C. Weist, Louisville, Ky.

[73] Assignee: Weist Industries, Inc., Louisville, Ky.

[22] Filed: Dec. 24, 1974

[21] Appl. No.: 536,154

[52] U.S. Cl. .............................................. 241/46.17
[51] Int. Cl.² ............................................. B02C 23/36
[58] Field of Search ................. 241/16, 17, 21, 27, 241/38, 46 R, 46 B, 46.11, 46.17, 60

[56] References Cited
UNITED STATES PATENTS

| | | |
|---|---|---|
| 2,945,634 | 7/1960 | Beck et al. ................... 241/46.17 X |
| 3,510,067 | 5/1970 | Beck et al. ................... 241/17 |
| 3,685,748 | 8/1972 | Beck et al. ................... 241/41 |
| 3,717,307 | 2/1973 | Beck ........................... 241/46.11 |
| 3,833,178 | 9/1974 | Beck ........................... 241/46.11 |

Primary Examiner—Granville Y. Custer, Jr.
Attorney, Agent, or Firm—Edward M. Steutermann

[57] ABSTRACT

The present invention provides a method and apparatus for comminuting selected plastic materials, where the apparatus can include a generally cylindrical receptacle means adapted to receive a selected quantity of a plastic material, to be comminuted where the receptacle has a generally vertical axis and an inlet and an outlet; cutter blade means disposed for rotation within said receptacle about an axis parallel to the vertical axis of the receptacle and in a generally horizontal plane, fixed cutter blade means carried on the sides of the receptacle means in spaced relation about the rotatable cutter blade means; fluid supply means to selectively supply a selected quantity of fluid to the receptacle; exhaust means for emission of vapor from the receptacle; lid means to selectively close a portion of the inlet to the receptacle; agitator means to selectively agitate a portion of the plastic materials received by the receptacle to urge the plastic material toward the cutter blade means; motive means for rotating the rotatable cutter blade means; power indicator means to indicate the amount of power supplied to the motive means; product exhaust means outlet means communicating with receptacle outlet for emission of comminuted plastic material from the receptacle; and fluid supply control means to actuate the fluid supply means to selectively supply fluid to the receptacle for a selected period of time; and emission control means to open the product exhaust means for a selected period of time for emission of comminuted plastic from the receptacle.

1 Claim, 3 Drawing Figures

PLASTIC COMMINUTING METHOD AND APPARATUS

BACKGROUND OF THE INVENTION

Petroleum stock shortages and resulting increased prices enhance the attractiveness of methods and devices for reprocessing previously disgarded plastic materials for use in manufacturing operations such as film waste, waste from extruding or waste and refuse from sealing and printing operations.

Various methods and apparatus as disclosed in U.S. Pat. Nos. 3,510,067 and 3,685,748 have been provided for reprocessing plastic materials, for example polyethelyene, by comminution of the material and subsequent cooling of the material by fluid addition.

However, such prior apparatus does not provide means to sequentially control the steps of the processing operation to improve the efficiency of the operation by reducing processing time for multiple batches.

More specifically, such previous apparatus have not recognized certain advantages of controlling the extent of comminution of plastic material prior to addition of the fluid or the treatment of the plastic material subsequent to comminution and particularly the processes and sequences necessary after introduction of the fluid.

Likewise, such previous apparatus has not recognized the benefits of agitation of the plastic material during the comminution to maintain a constant power input to the rotating blade during the comminution cycle.

SUMMARY OF THE INVENTION

The present invention provides an apparatus for comminution of selected plastic materials where it is recognized that timing and sequential operation is important to improve efficiency of operation as well as overall productivity for multiple batches and that agitation of the plastic material charged to the apparatus is important to optimize efficiency of the apparatus and method.

In accordance with another feature of the present invention it is also recognized that addition of a fluid to the comminuted plastic mass should be accomplished at a specific time during the comminution cycle characterized when the comminuted plastic particles form a toroidal shaped mass flowing around the rotating blade where the toroid of particulate material rotates around the periphery of the recepticle at a speed less than the speed of the rotating blade and can be introduced when portions of the toroidal mass began to break away and fall into the vortex formed by the rotating blade.

Various other features of the method and apparatus of the present invention will become obvious to those skilled in the art upon reading the disclosure set forth hereinafter.

BRIEF DESCRIPTION OF THE DRAWINGS

Referring now to the drawings which only show one example of apparatus in accordance with the present invention used in the description of method in accordance with the present invention:

Referring to FIG. 1, the example of one apparatus in accordance with the present invention shown includes a generally cylindrical receptacle 1 which can be supported by a base 5, having a walkway 5a where receptacle 1 can be provided with a lid 2 which can be pivotably fastened to receptacle 1 by hinge means described hereinafter to be opened as shown in FIG. 2 provide access to receptacle 1.

Figure 1:
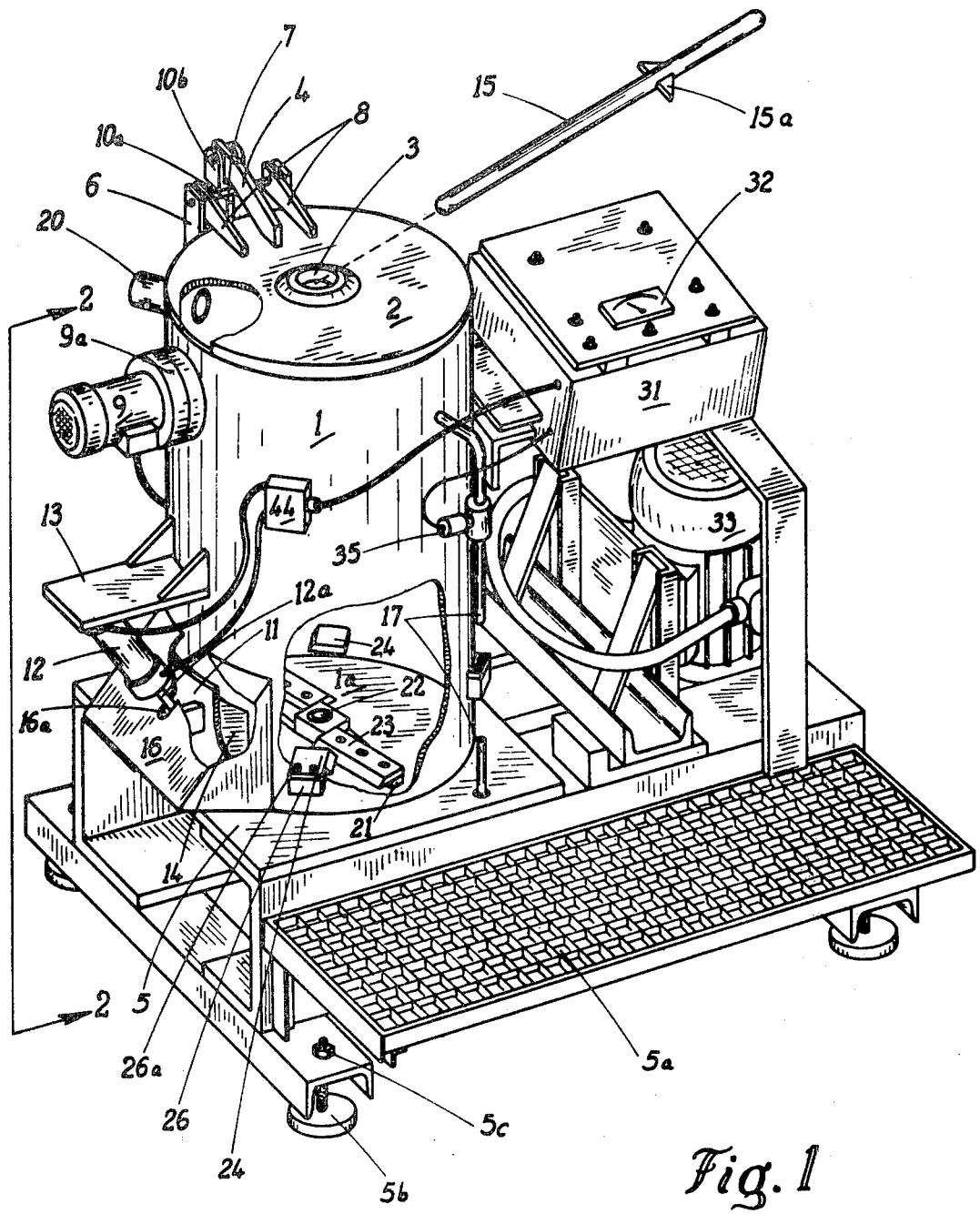
FIG. 1 is an illustration in perspective, partly in section of an apparatus in accordance with the present invention.

Base 5 can be supported on shock absorbing feet 5b secured by cooperative bolt means 5c to provide means to level the apparatus and to dampen vibration of the apparatus in operation.

Receptacle 1 includes a bottom 1a. An observation port 3 is provided in lid 2, adapted to receive a probe 15 which can be used to agitate the plastic material charged to receptacle 1. Wings 15a are provided on probe 15 to engage the periphery of port 3 and are advantageously located on probe 15 to prevent the end of the probe from contacting rotating blades 23 and as described hereinafter.

A hinge arrangement, as shown, can be provided to open lid 2. In the example shown spaced parallel arms 8 are carried by lid 2 to be received between spaced generally parallel arms 6 carried by receptacle 1. A shaft 7 is provided to be received by cooperative aperatures in arms 6 and 8 to provide pivot means for lid 2. A second arm 4 is carried by lid 2 to extend over the edge of lid 2 and connected to a pivotable connector 10b carried by the operator shaft 10a of an air cylinder 10 shown in FIG. 2. Operation of cylinder 10 is controlled by air supplied through solenoid air control valve 15 to cylinder 10 and, it will be understood as described hereinafter that air cylinder 10 and arm 4 open and close lid 2.

A blower 9a, powered by a motor 9, is provided to communicate with receptacle 1 to selectively withdraw vapor from receptacle 1. Operation of blower 9 is controlled by the control circuit as described hereinafter and located in control box 31.

A rotating arm 21 is provided in the bottom of receptacle 1 and carried for rotation in a generally horizontal plane by shaft 22 where shaft 22 is disposed generally parallel to the longitudinal axis of receptacle 1. Arm 21 is adapted to carry blades 23, which can be double edged so that if one side of the blade becomes dull the blade can be reversed to provide a new edge. In the example shown arm 21 is adapted for rotation in a clockwise direction as viewed from the top of receptacle 1.

Figure 2:
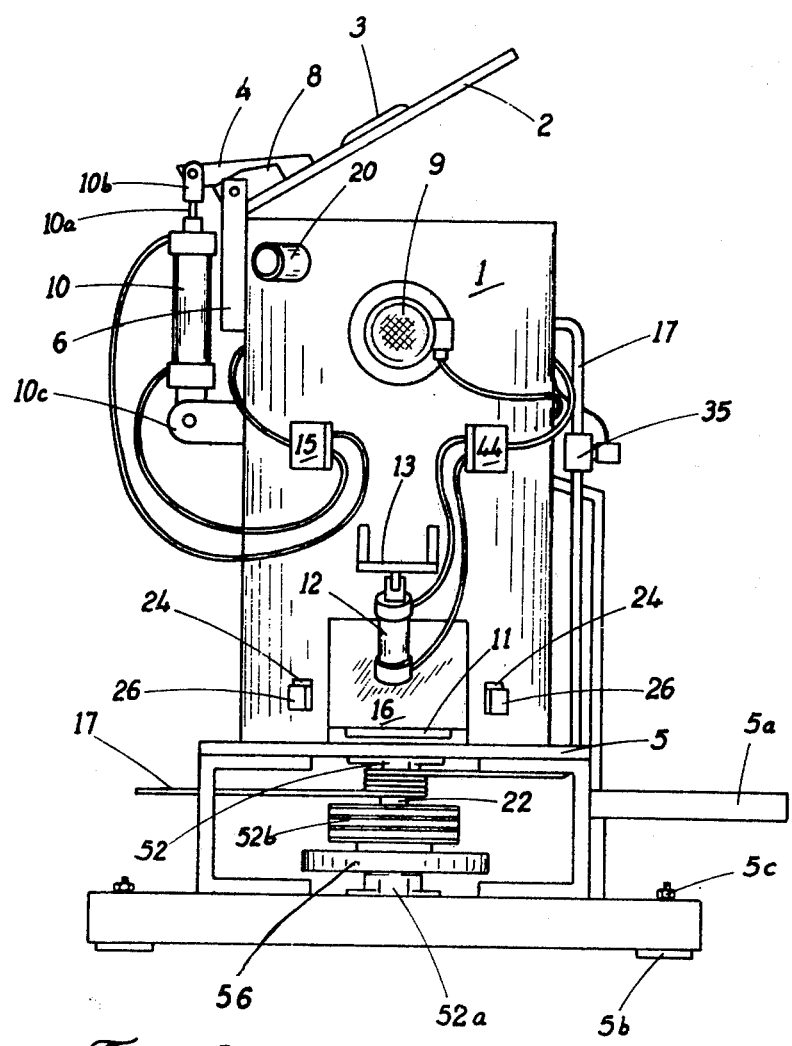
FIG. 2 is a view taken along line 2—2 of FIG. 1, with the lid open.

Shaft 22 is driven by an electric motor 33, for example a 3 phase 240 volt AC motor, by cooperative drive belt and pulley means as shown in FIG. 2 and further described hereinafter.

Cooperative fixed blades 24 are provided in spaced relation around the periphery of receptacle 1 and can be located a selected distance above or below the plane of rotation of blades 23. In the example shown fixed blades 24 are located a selected distance above rotating blades 23 so that plastic material charged to receptacle is comminuted between rotating blades 23 and fixed blades 24.

In the example shown blades 24 extend through cooperative openings provided in the sides of receptacle 1 and are retained by bolts 26a secured to lugs 26 carried on the outside of recepticle 1, as shown.

As shown, an outlet opening 14 can be provided adjacent the bottom of receptacle for emission of comminuted material from receptacle 1. A cooperative cover 11 can be provided to cover outlet 14 to prevent emission of material from receptacle 1 until the proper stage in the comminution cycle.

Cover 11 is operated by an air cylinder 12 which in turn is operated by means of a solenoid switch 44 to control air flow to cylinder 12 as described hereinafter with respect to FIG. 3. Cylinder 12 is adapted to selectively urge cover 11 into place covering opening 14 and remove cover 11 from opening 14 for emission of comminuted material.

Cover 11 is carried within an outlet chute 16 which is provided to direct material emitted from outlet 14 to receptacle (not shown) which can be placed below chute 16 to receive the comminuted material from outlet 14.

In accordance with another feature of the present invention a fluid is selectively supplied to recepticle 1 at a selected stage in the comminution process characterized as described hereinafter. The fluid can, within the scope of the present invention, be water. In the example shown in the Figures, a water line 17 is provided to supply water to receptacle 1. As shown in FIG. 2 water supply 17 can be wrapped around a high speed bearing 52 located beneath bottom 1a of receptacle 1 which receives shaft 22. A second bearing 52a is located on shaft 22 beneath bearing 52 and the drive means, in this case a pulley driven by belts 52b from motor 33, is fastened to shaft 22 between bearings 52 and 52a. As shown, cooling water supply line 17 is wrapped around bearing 52 to cool the bearing. A seal, not shown, can be provided in bottom 1a of receptacle 1 to prevent escape of material from receptacle 1. In accordance with one feature of the present invention, it has been found that without cooling, the heat from bearing 52 is transmitted to shaft 22 and thence to the material in receptacle 1 which contacts the portion of shaft 22 disposed in receptacle 1 and melts the material which flows to bearing 52 and results in failure of bearing 52. It has been found that cooling bearing 52 prevents failure of bearing 52.

Referring now to FIG. 2, it will be noted that a flywheel 56 is also provided on shaft 22 which drives rotor 21. In accordance with another feature of the present invention it is recognized that flywheel 56 improves the efficiency and effectiveness of the comminution cycle. Specifically, the flywheel inertia prevents stalling of the rotor 21 when the charge of plastic material is first added to receptacle 1 and, because of the problems sometimes occuring with bridging of the plastic material and subsequent breaking of the bridging by agitation, as described hereinafter, prevents stalling during the comminution cycle.

A solenoid controlled valve 35 can be provided in water line 17 to selectively control flow of fluid to receptacle 1. Operation of valve 35 is controlled as described hereinafter.

A light window 20 can be provided in receptacle 1 to receive a cooperative light for illumination of the inside of receptacle 1.

Figure 3:
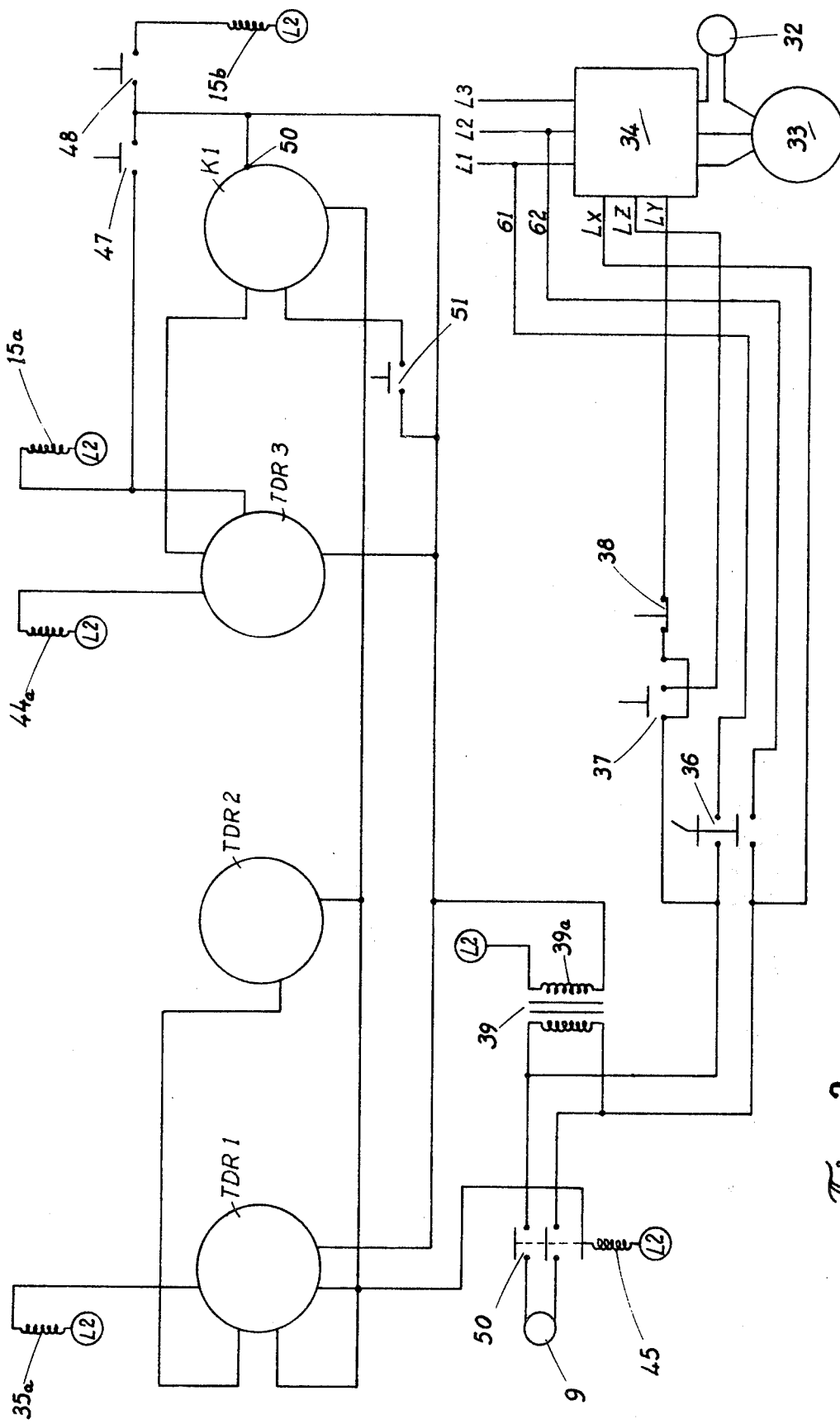
FIG. 3 is a schematic diagram illustrating a control circuit for use in the apparatus shown in FIG. 1 and within the scope of the present invention.

An example of a control circuit for operation of the apparatus shown in FIG. 1 is a schematically illustrated in FIG. 3.

In the example of FIG. 3, a three phase 240 VAC power supply is provided to the device. The terminals L1, L2, L3 are provided to a starter 34 provided for motor 33, as shown where L2 is the ground terminal. An ammeter 32 or other power indicating device can be provided across the leads to motor 33 to indicate power consumption by motor 33.

A circuit from terminals L1 and L2 is provided to supply power, for example 120 VAC to the control circuit with a master switch 36 provided in a circuit 61, 62, and L1, L2, to initiate operation of the apparatus as described hereinafter.

A starter circuit connected to terminals $L_y$, $L_x$ and $L_z$ of a motor starter 34 is provided in parallel across circuit 61, and 62 including starter 34 to initiate operation of motor 33 which drives rotatable arm 21 as previously described. Switches 37 is proivded to activate starter 34 to initiate operation of motor 33 and normally close switch 38 is provided to terminate operation of motor 33.

Circuit 61, 62 is also connected to transformer 39 and to a fan motor 9 which operates fan 9a for emission of vapors from receptacle 1. A switch 50 operable by a solenoid 45 is provided in series with fan motor 9 to control operation of the fan motor.

Secondary coil 39a of transformer 39 can be adapted to provide power of selected voltage to a sequential control circuit in accordance with one feature of the present invention as described hereinafter. One side of secondary coil 39a is connected to the various elements of the sequential control circuit described hereinafter and the other side is connected to ground L2 of the 3 phase power supply L1, L2, L3.

Sequential operation of the apparatus and method in accordance with the present invention can include admission of a selected fluid to receptacle 1 after comminution of the plastic material, providing a selected blending time, emission of the comminuted product from receptacle 1, and opening lid 2. The sequential steps within the scope of the present invention can be initiated by closing switch 51 which activates a holding relay K1, to start the sequential cycle described hereinafter. K1 includes a holding circuit connected to secondary coil 39a of transformer 39 through terminal 50 so that when K1 is activated and switch 51 is released, the holding circuit permits continued current flow to the sequential circuit through relay K1.

Relay K1 activates time delay relay TDR1. TDR1 activates a coil 35a of valve 35 to open valve 35 to admit a selected fluid, for example, water, to receptacle 1. Relay K1 also activates coil 45 to switch 52 to initiate operation of fan motor 9. After a selected time, determined by the amount of water desired in receptacle 1, TDR1 deactivates coil 35a of valve 35 to close valve 35 and terminate fluid flow to receptacle 1. TDR1 then activates TDR2 which is provided to allow a specific time for continued agitation for blending and formation of particles of the comminuted material in receptacle 1 after introduction of the fluid. After a selected time interval, TDR2 activates time delay relay TDR3 which in turn initially supplies power to coil 44a of solenoid switch 44 which controls operation of air cylinder 12. When power is supplied to coil 44a which is connected in series with TDR3 between winding 39a of transformer 39 and ground 12, switch 44 supplies air to cylinder 12 to remove cover 11 to open outlet 14 of receptacle 1. TDR3 supplies power to coil 44a for a selected period of time.

During the time coil 44a is actuated, cover 11 is removed from opening 14 and comminuted material is emitted from chute 16. Cover 11 is removed from opening 14 for only a selected length of time depending on the character of the material, the size of the batch. After a selected time period has elapsed, which allows the material to be discharged from receptacle 1, coil 44a is deactivated so cylinder 12 returns cover 11 to position closing outlet 14 and TDR3 then activates coil 15a, which is the activator for solenoid switch 15 which controls operation of air cylinder 10 to open lid 2.

Coil 15a is in series with TDR3 between secondary coil 39a of transformer 39 and ground L2 of the three phase power supply to the unit.

After TDR3 activates solenoid 15a, lid 2 is fully opened signalling the end of the timed sequential cycle. At the same time TDR3 is released, the holding circuit in K1 is released to terminate operation of the sequential circuit, and operation of suction fan 9.

It will be noted that a manual switch 47 can be provided to override the portion of the circuit which operates solenoid 15 and coil 15a where normally open switch 47 is in the circuit in series with coil 15a between secondary winding 39a of transformer 39, and ground 22 of the three phase power supply to open lid 2.

A second coil 15b can be provided in switch 15 to reverse the action of air cylinder 10 to close lid 2. Normally open switch 48 is located in series with coil 15b between secondary coil 39a of transformer 39 and ground L2 of three phase power supply.

Thus, to initiate operations of the device with lid 2 open, a selected weight, for example 25 pounds of selected plastic to be recycled, for example polyethylene, is charged to receptacle 1 with arm 21 rotating.

Lid 2 is closed to retain heat in receptacle 1 and comminution of the plastic material begins. In accordance with one feature of the present invention, the plastic is agitated during the comminution cycle to maintain the power supply to motor 33, as indicated by ammeter 32 within a selected range. While various means may be provided to agitate the plastic material in receptacle 1, in the example shown in accordance with the present invention, a hand held agitator 15 is provided to be inserted through opening 3 of lid 2. Agitator 15 is provided with wings 15a located on agitator 15 to engage the sides of opening 3 to prevent insertion of the entire agitator into receptacle 1. Advantageously, wings 15a are disposed in agitator 15 so that when the wings engage the sides of opening 3, the end of agitator 15 does not reach rotating blades 23.

The apparatus is allowed to operate a selected time, for example 2 minutes, until selected characteristics discussed hereinafter are noted, while the material is agitated to maintain the power within a selected range, for example 30 to 60 amps for a 220 VAC motor 33. It has been found that if the material is not agitated during comminution it tends to bridge over the rotating blade and prolongs the comminution cycle adversely affecting operating efficiency of the device.

In accordance with one feature of the present invention, it is recognized that in comminuting plastic material in equipment of the type previously discussed, the plastic material at the optimum state of comminution, forms a toroidal shaped particulate mass around the inner periphery of receptacle 1 adjacent the ends of the blades 23, thus forming a vortex in the center of blades 23. In accordance with another feature of the present invention, it is recognized that if the plastic material is comminuted beyond a specific time the heat of comminution will form the material into a relatively solid plastic toroid which cannot easily be removed from the receptacle and which will not form into separable particles on exposure to a fluid which cools the particles.

Thus in accordance with another feature of the present invention it is recognized that when the material is comminuted to the point where the aforementioned toroid is formed, with the toroid moving around the periphery of receptacle 1 at a speed slower than the speed of rotation of blades 23 and when sections of plastic material begin to break away from the toroidal mass and fall into the vortex formed by the rotation of blades 23, a cooling fluid, for example water, can be added to the material and the material will then be formed into separate particles which can be emitted from receptacle 1.

In the example shown, when the plastic material has been comminuted to the point where it achieves the characteristics previously described, the sequential cycle is started by closing button 51, which through relay K1 and TDR1 energizes coil 35a of valve 35 so water, which has been preheated by bearing 52, is introduced to receptacle 1. It is recognized that in accordance with the method provided by the present invention the quantity of water or coolant added, based on the amount charged, is important. It has been found that a quantity of water equal to from 3.0% to 6.0% by weight of the plastic material is satisfactory. Thus for a 25 pound charge of plastic material between 12 ounces and 24 ounces of water can be added to receptacle 1.

After the fluid is added to receptacle 1 over a selected period of time, a portion of the fluid, in this case water, is vaporized and a portion of the vapor is withdrawn by fan 9. The addition of the proper amount of water at the proper time in the operating sequence, as previously described, forms the comminuted material into separable particles. As previously described with respect to the control circuit shown in FIG. 3, after the water introduction cycle TDR1 activates TDR2 which provides a time delay for blending of the material and formation of the particles. TDR2 then activates TDR3 which activates coil 44a to open cover 11 for discharge of comminuted material from receptacle 1. TDR3 then deactivates coil 44a so cover 11 closes opening 14 and activates coil 15a so lid 2 is opened for admission of a new charge of material and the operation of a new cycle.

In accordance with another feature of the present invention, it is recognized that substantial heat is retained in receptacle 1, by frequent repetition of the comminution cycle and that heat is a major factor in proper comminution of plastic material. Accordingly, it is recognized that by providing more efficient processing cycles, and reducing the time lapse in such cycles, more of the heat retained by receptacle 1 is available for processing of subsequent batches so that the efficiency of the subsequent cycles can likewise be improved.

One example of an apparatus included within the present invention can have a receptacle with a height of 36 ins., a diameter of 24 ins. driven by a 30–60 horsepower motor at 1500–1800 RPM.

When properly operated in accordance with the method provided herein, a device of the character and size described herein can successfully be utilized to process more than 500 pounds of material per hour, principally because of the agitation of the plastic during comminution and the timed sequential cycle provided in accordance with the present invention and because of the recognition that frequent repetition of the processing cycle permits the heat retained in the apparatus to advantageously be utilized in improving the efficiency of subsequent cycles. By the method provided by the present invention, it has been found that the bulk density of the product can be controlled and that reprocessed plastic material having a bulk density in excess of 60% of the bulk density of virgin material can be provided and that the reprocessed material provided can be used with or without blending with virgin material.

It will be recognized that the foregoing is but one example of an apparatus and method within the scope of the present invention and that various other modifications will occur to those skilled in the art upon reading the disclosure set forth hereinbefore:

The invention claimed is:

1. An apparatus for communiting a plastic material including: generally cylindrical receptacle means having a vertical axis, a generally horizontal bottom, an inlet opening to receive selected plastic, and outlet opening means located in the bottom portion of said receptacle for emission of comminuted plastic material; lid means to selectively close said inlet; outlet cover means to selectively cover said outlet means; rotatable cutter blade means adapted for rotation about an axis generally parallel to said vertical axis and in a generally horizontal plane within said receptacle and in spaced relation from said receptacle bottom; fixed cutter blade means carried on the periphery of said receptacle means in spaced relation from said rotating cutter blade means; fluid supply means selectively inject a selected fluid into said receptacle means; a generally vertical rotatable shaft means carrying said rotatable cutter blade means; bearing means located beneath and adjacent said receptable bottom to receive said shaft means for rotation therein, and bearing cooling means to receive heat from said bearing means, where said bearing cooling means includes means to receive said fluid to be admitted to said receptacle in heat transfer relation prior to supplying said fluid to said receptacle means.

\* \* \* \* \*